US007188114B2

(12) United States Patent
Liu et al.

(10) Patent No.: US 7,188,114 B2
(45) Date of Patent: Mar. 6, 2007

(54) PERSISTENT DATA STORAGE FOR METADATA RELATED TO WEB SERVICE ENTITIES

(75) Inventors: Jeffrey Y. Liu, Toronto (CA); Yen Lu, North York (CA)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/670,425

(22) Filed: Sep. 24, 2003

(65) Prior Publication Data
US 2004/0133580 A1 Jul. 8, 2004

(30) Foreign Application Priority Data
Oct. 25, 2002 (CA) .................... 2409882

(51) Int. Cl.
G06F 17/30 (2006.01)
(52) U.S. Cl. ............. 707/100; 707/104.1; 707/10
(58) Field of Classification Search ........ 707/100–105, 707/10; 709/200 S
See application file for complete search history.

(56) References Cited

U.S. PATENT DOCUMENTS

| 5,737,736 | A | 4/1998 | Chang | 707/102 |
|---|---|---|---|---|
| 5,809,509 | A | 9/1998 | Blackman et al. | 707/103 |
| 5,848,419 | A | 12/1998 | Hapner et al. | 707/303 |
| 6,063,128 | A | 5/2000 | Bentley et al. | 703/6 |
| 2002/0161745 | A1* | 10/2002 | Call | 707/1 |
| 2003/0217044 | A1* | 11/2003 | Zhang et al. | 707/3 |
| 2003/0217140 | A1* | 11/2003 | Burbeck et al. | 709/224 |
| 2005/0144285 | A1* | 6/2005 | Hickman | 709/227 |
| 2005/0198188 | A1* | 9/2005 | Hickman | 709/217 |

OTHER PUBLICATIONS

Connor, R.C.H. et al., "Using Persistence Technology to Control Schema Evolution," ACM SIGAP Conference, Phoenix, AZ, Mar. 1994, pp. 1-15.
Cooper, R.L. et al., "Constructing Database Systems in a Persistent Environment," Proceedings of the 13th VLDB Conference, Brighton, 1987, pp. 117-125.

* cited by examiner

Primary Examiner—John Cottingham
Assistant Examiner—Dennis L. Vautrot
(74) Attorney, Agent, or Firm—Sawyer Law Group LLP

(57) ABSTRACT

A method and system for storing metadata related to Web service entities is disclosed. The method according to a preferred embodiment comprises browsing a Web service and storing metadata relating to an entity of the Web service as a binding description in a format for assisting in an inspection of a site for available services. Preferably, the Web Services Inspection Language, or other format for assisting in the inspection of a site for available services, may be used as a format for storing metadata related to Web service-related entities. Because WSIL is XML-based, the documents that store the metadata are human readable, platform independent and conform to an open standard.

24 Claims, 10 Drawing Sheets

200

```
<schema targetNamespace="http://schemas.example.com/uddiregistry/"
    xmlns:xsd="http://www.w3.org/2001/XMLSchema" elementFormDefault="qualified">
    xmlns="http://www.w3.org/2001/XMLSchema" >
    <element name="registryDescription">
        <complexType>
            <sequence>
                <element name="inquiryURL" type="xsd:string" minOccurs="1" maxOccurs="1"/>
                <element name="publishURL" type="xsd:string" minOccurs="0" maxOccurs="1"/>
                <element name="registrationURL" type="xsd:string" minOccurs="0" maxOccurs="1"/>
            </sequence>
        </complexType>
    </element>
</schema>
```

```
<schema targetNamespace="http://schemas.example.com/contactinfo/"
    xmlns:xsd="http://www.w3.org/2001/XMLSchema" elementFormDefault="qualified">
    xmlns="http://www.w3.org/2001/XMLSchema" >
    <element name="contactInformation">
        <complexType>
            <sequence>
                <element name="contactURL" type="xsd:string" minOccurs="1" maxOccurs="1"/>
            </sequence>
        </complexType>
    </element>
</schema>
```

```
<schema targetNamespace="http://schemas.example.com/businessassertion/"
    xmlns:ba="http://schemas.example.com/businessassertion/"
    xmlns:wsiluddi="http://schemas.xmlsoap.org/ws/2001/l0/inspection/uddi/"
    xmlns:xsd="http:www.w3.org/2001/XMLSchema"
    xmlns="http:www.w3.org/2001/XMLSchema"elementFormDefault="qualified">

<complexType name="businessType">
    <sequence>
        <element ref="wsiluddi:businessDescription" minOccurs="1" maxOccurs="1"/>
    </sequence>
</complexType>

<complexType name="businessAssertionType">
    <sequence>
        <element name="fromBusiness" type="ba:businessType" minOccurs="1" maxOccurs="1"/>
        <element name="toBusiness" type="ba:businessType" minOccurs="1" maxOccurs="1"/>
        <element name="status" type="xsd:string" minOccurs="1" maxOccurs="1"/>
        <element name="type" type="xsd:string" minOccurs="1" maxOccurs="1"/>
    </sequence>
</complexType>

<element name="businessAssertion" type=ba:businessAssertionType"/>

</schema>
```

```
<schema targetNamespace="http://schemas.example.com/tmodel/"
    xmlns:xsd="http://www.w3.org/2001/XMLSchema"
    xmlns="http://www.w3.org/2001/XMLSchema"elementFormDefault="qualified">
    <element name="tModel">
        <complexType>
            <sequence>
                <element name="tModelKey" type="xsd:string"/>
            </sequence>
        </complexType>
        <attribute name="location" type="xsd:anyURI" use="optional"/>
    </element>
</schema>
```

FIG.5

```
<?xml version="1.0"?>
<inspection
targetNamespace="http://schemas.xmlsoap.org/ws/2001/IO/inspection/"
    xmlns:wsilwsdl="http://schemas.xmlsoap.org/ws/2001/IO/inspection/wsdl/"
    xmlns:wsiluddi="http://schemas.xmlsoap.org/ws/2001/IO/inspection/uddi/"
    xmlns:wsiluddiregistry="http://schemas.example.com/uddiregistry/"
    xmlns:businessassertion="http://schemas.example.com/businessassertion/"
    xmlns:tmodel="http://schemas.example.com/tmodel/"
    xmlns:wsilcontactinfo="http://schemas.example.com/contactinfo/">
```
⎫
⎬ 601
⎭

```
<service>
    <description
referencedNamespace="http://schemas.xmlsoap.org/wsdl/"
        location="http://www.example.com/RentalService.wsdl">
    </description>
</service>
```
⎫
⎬ 602
⎭

600

```
<service>
    <description referencedNamespace="urn:uddi-org.api_v2">
        <tmodel:tModel
location="http://www.example.com/uddi/inquiryapi">
            <tmodel:tModelKey>
                uuid:12345-ABCDE-67890-FGHIJ
            </tmodel:tModelKey>
        </tmodel:tModel>
    </description>
</service>
```
⎫
⎬ 603
⎭

```
<link referenceNamespace="urn:uddi-org:api_v2">
    <wsiluddi:businessDescription
location="http://uddi.ibm.com/ubr/inquiryapi">
        <wsiluddi:businessKey>
            EDF0B820-OE8A-11D6-B8F9-000629DC0A2B
        </wsiluddi:businessKey>
    </wsiluddi:businessDescription>
</link>
```
⎫
⎬ 604
⎭

```
<link referenceNamespace="urn:uddi-org:api_v2">
    <wsiluddi:businessDescription location="http://www.example.com/inquiryapi">
        <wsiluddi:businessKey>
            ABCDE-12345-FGHIJ-67890
        </wsiluddi:businessKey>
    </wsiluddi:businessDescription>
    <businessassertion:businessAssertion>
        <businessassertion:fromBusiness>
            <wsiluddi:businessDescription
location="http://www.example.com/inquiryapi">
                <wsiluddi:businessKey>
                    ABCDE-12345-FGHIJ-67890
                </wsiluddi:businessKey>
            </wsiluddi:businessDescription>
        </businessassertion:fromBusiness>
        <businessassertion:toBusiness>
            <wsiluddi:businessDescription
location="http://uddi.ibm.com/ubr/inquiryapi">
                <wsiluddi:businessKey>
                    EDF0B820-OE8A-11D6-B8F9-000629DC0A2B
                </wsiluddi:businessKey>
            </wsiluddi:businessDescription>
        </businessassertion:toBusiness>
        <businessassertion:status>
            Completed
        </businessassertion:status>
        <businessassertion:type>
            Parent-Child
        </businessassertion:type>
    </businessassertion:businessAssertion>
</link>
```
} 606

```
<link
referenceNamespace="http://www.example.com/uddiregistry/">
    <wsiluddiregistry:registryDescription>
        <wsiluddiregistry:inquiryURL>
            http://www.example.com/inquiryapi
        </wsiluddiregistry:inquiryURL>
        <wsiluddiregistry:publishURL>
            http://www.example.com/publishapi
        </wsiluddiregistry:publishURL>
        <wsiluddiregistry:registrationURL>
            http://www.example.com/registration/
        </wsiluddiregistry:registrationURL>
    </wsiluddiregistry:registryDescription>
</link>
```
⎬ 608

```
<link
referenceNamespace="http://www.example.com/contactinfo/">
    <wsilcontactinfo:contactInformation>
        <wsilcontactinfo:contactURL>
            http://www.example.com/contact/
        </wsilcontactinfo:contactURL>
    </wsilcontactinfo:contactInformation>
</link>
```
⎬ 610

```
</inspection>
```

FIG.6C

PERSISTENT DATA STORAGE FOR METADATA RELATED TO WEB SERVICE ENTITIES

CROSS-REFERENCE TO RELATED APPLICATIONS

This application claims benefit under 35 USC §119 of Canadian Application No. 2,409,882, filed on Oct. 25, 2002.

FIELD OF THE INVENTION

The present invention relates to Web services and, more, particularly, to persistently storing metadata related to Web service entities.

BACKGROUND OF THE INVENTION

A Web service is a software module identified by a Uniform Resource Identifier (URI), whose interfaces and bindings are capable of being defined, described and discovered. Web services support direct interactions with other software applications using XML based messages via various communication protocols.

Web services are modular software components wrapped inside a specific set of Internet communications protocols. These software components can be run over the Internet and can communicate with other components automatically without human intervention. Advantageously, Web services can be used on an Intranet inside a firewall, or out across the greater Internet. A Web service itself is a software module delivered over the Internet or an intranet via XML messaging. A given modular software component can be built in a variety of ways including, most notably, but not exclusively, using Java.

In order for a computer or application to use a Web service, the computer or application needs be able to find a service description of the Web service and then bind to the service description. To accomplish this finding and binding, there are three key parts to the Web services architecture: a service provider, a service registry and a service requester. Together, the three key parts perform three operations on a Web service: publish, find and bind.

The publish operation makes information about the Web service available so that the information can be found and used. In other words, the publish operation makes the service description publicly available. The find operation is used by a service requester to discover the Web service. The find operation is the way in which the computer or application searches for Web services. The find operation occurs when the service requester retrieves a service description directly or queries the registry for the type of service required. The find operation may be involved in two different lifecycle phases for the service requester (or service provider): at design time in order to retrieve the Web service's interface description for program development, and at runtime in order to retrieve the service's binding and location descriptions for invocation.

The bind operation allows the service to be used by the computer or application requesting the service. More particularly, the bind operation allows the application to understand what the Web service is, where the Web service is located and how to link to the Web service. The bind operation occurs when the service requester invokes or initiates an interaction with the Web service at runtime using binding details in the service description to locate, contact and invoke the Web service.

A mechanism for publishing and finding service descriptions is provided by Universal Description, Discovery and Integration (UDDI). UDDI is an XML-based registry for businesses worldwide to list themselves on the Internet. The ultimate goal of UDDI is to streamline online transactions by enabling companies to find one another on the World Wide Web and make systems that are interoperable for e-commerce. UDDI allows businesses to list themselves by name, product, location or the Web service offered.

The UDDI data entities provide support for defining both business and service information. There are four primary data types in a UDDI registry: businessEntity, businessService, bindingTemplate and tModel. The businessEntity provides information about a business and can contain one or more businessServices. The business is the Web service provider. The technical and business descriptions for a Web service are defined in a businessService and the bindingTemplates of the businessService. The bindingTemplate includes technical details necessary to invoke a Web service. These technical details include Uniform Resource Locators (URLs, e.g., Web addresses), information about method names, argument types and so on. Each bindingTemplate contains a reference to one or more tModels. A tModel is used to define the technical specification for a service.

The Web Services Description Language (WSDL) is an XML-based language for describing Web services. A WSDL service description contains an abstract definition for a set of operations and messages, a concrete protocol binding for these operations and messages and a network endpoint specification for the binding.

WSDL is derived from the Simple Object Access Protocol (SOAP) developed by Microsoft and the Network Accessible Service Specification Language (NASSL) developed by IBM.

The service description information defined in WSDL is complementary to the information found in a UDDI registry. UDDI provides support for many different types of service descriptions. As a result, UDDI has no direct support for WSDL or any other service description mechanism.

While WSDL is a standard for describing services at a functional level and UDDI is a standard for describing services from a more business-centric perspective, it has been recognized that there is a need for the ability to tie together, at the point of offering of the service, these various sources of information. Ideally, these various sources of information should be tied together in a manner which is both simple to create and simple to utilize. Web Services Inspection Language (WSIL) is known to address this need by defining an XML grammar that facilitates the aggregation of references to different types of service description documents and provides a well-defined pattern of usage for instances of this grammar. By doing this, WSIL provides a means by which to inspect sites for service offerings.

The WSIL specification (see <<http://www-106.ibm.com/developerworks/webservices/library/ws-wsilspec.html>>provides an XML format for assisting in the inspection of a site for available services and a collection of rules for how inspection-related information should be made available for consumption. Notably, the specification may be more widely known as a specification for Web Services Inspection or, simply, "WS-I". A WSIL (or WS-I) document provides a means for aggregating references to pre-existing service description (inspection) documents which have been authored in any number of formats. These inspection documents are then made available at the point-of-offering of the service as well as through references that may be placed within a content medium.

As discussed hereinbefore, a service provider may publish a WSDL document to describe the details of the Web service provided such that an application requiring that Web service may discover the service provider as a provider of a service required by the application. The application learns how to talk to the Web service through the WSDL document offered by the service provider. In general, the WSDL document only describes the Web service itself, the WSDL document does not contain other information such as a URL of the WSDL document or the contact information for the business providing the Web service. This information about the WSDL document may be called the metadata of the WSDL document.

In a situation wherein the application requires a Web service more than once, metadata related to the WSDL document that describes the Web service may be important to the application well into the life of the application. It is preferable, then, that the metadata be maintained through startup and shut down of the application.

The metadata can be maintained by a database system. However, maintaining WSDL-related metadata may be considered a computationally intensive task for the application to perform along with the task for which the application was originally designed. Furthermore, the application may be considered to be tied to the platform on which the database system is running.

Another approach to maintaining the metadata is to use Java object serialization. However, Java object serialization has several disadvantages including low readability, low porting ability (the data cannot be easily retrieved by applications written in other languages) and the data may no longer be usable if the source of the Java object changes.

Clearly then, a need exists for a programming language-independent manner in which metadata related to published descriptions of Web services may be stored without the computational intensity of typical database systems.

SUMMARY OF THE INVENTION

Metadata related to Web service-related entities may be stored in a format for assisting in the inspection of a site for available services, for example, the WSIL format. By doing so, a light-weight mechanism is realized to store the Web services related metadata. Advantageously, as WSIL is XML-based, the metadata may be stored as XML fragments. Thus, the metadata may be human readable, platform independent and conform to an open standard.

As an application may require a Web service a number of times, metadata such as the URL of a WSDL document would be useful to the application if the WSDL document became outdated and needed to be refreshed. Additionally, other metadata may be required. For instance, the contact information for the Web service would be useful for reporting any bugs found with the Web service.

In accordance with an aspect of a preferred embodiment of the present invention there is provided a method of storing metadata related to a database containing data describing a networked service. The method includes storing the metadata related to the registry as a binding description in a format for assisting in the inspection of a site for available services.

In accordance with another aspect of a preferred embodiment of the present invention there is provided a method of storing metadata related to contact information of business parties. The method includes storing the metadata related to the contact information of business parties as a binding description in a format for assisting in the inspection of a site for available services.

In accordance with still another aspect of a preferred embodiment of the present invention there is provided a method of storing metadata related to a business assertion, where metadata related to a first business is stored as a binding description in a format for assisting in the inspection of a site for available services. The method includes including metadata related to a business assertion between the first business and a second business.

In accordance with a further aspect of a preferred embodiment of the present invention there is provided a method of storing metadata related to a UDDI tModel. The method includes storing the metadata related to the UDDI tModel as a binding description in a format for assisting in the inspection of a site for available services.

In accordance with an even further aspect of a preferred embodiment of the present invention there is provided a Web services browsing system. The system is adapted to browse a Web service and store metadata related to an entity of the Web service in a document formatted using a format for assisting in the inspection of a site for available services. Additionally, a computer readable medium is provided for containing computer-executable instructions to be executed by a processor in such a system.

In accordance with a still further aspect of a preferred embodiment of the present invention there is provided a method of resurrecting a Web services-related entity. The method includes presenting a display of metadata related to a plurality of Web services-related entities, the display based on a document formatted using a format for assisting in the inspection of a site for available services, receiving an indication of a selected Web service-related entity of the plurality of Web service-related entities and responsive to the receiving, further processing the selected Web service-related entity. In another aspect of a preferred embodiment of the present invention, a computer readable medium is provided for adapting a general purpose computer to perform this method. As well, a Web services browsing system is provided for performing this method.

Other aspects and features of a preferred embodiment of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 2 illustrates an exemplary schema for storing metadata related to a UDDI registry as a binding description in WSIL according to an embodiment of the present invention;

FIG. 3 illustrates an exemplary schema for storing contact information of business parties as a binding description in WSIL according to an embodiment of the present invention;

FIG. 4 illustrates an exemplary schema for storing metadata related to a business assertion as a binding description in WSIL according to an embodiment of the present invention;

FIG. 5 illustrates an exemplary schema for storing metadata related to a UDDI tModel as a binding description in WSIL;

FIG. 6A illustrates an initial portion of an exemplary WSIL document created according to an embodiment of the present invention;

FIG. 6B illustrates a further portion of the exemplary WSIL document of FIG. 6A;

FIG. 6C illustrates a final portion of the exemplary WSIL document of FIGS. 6A and 6B;

DETAILED DESCRIPTION

Figure 1:
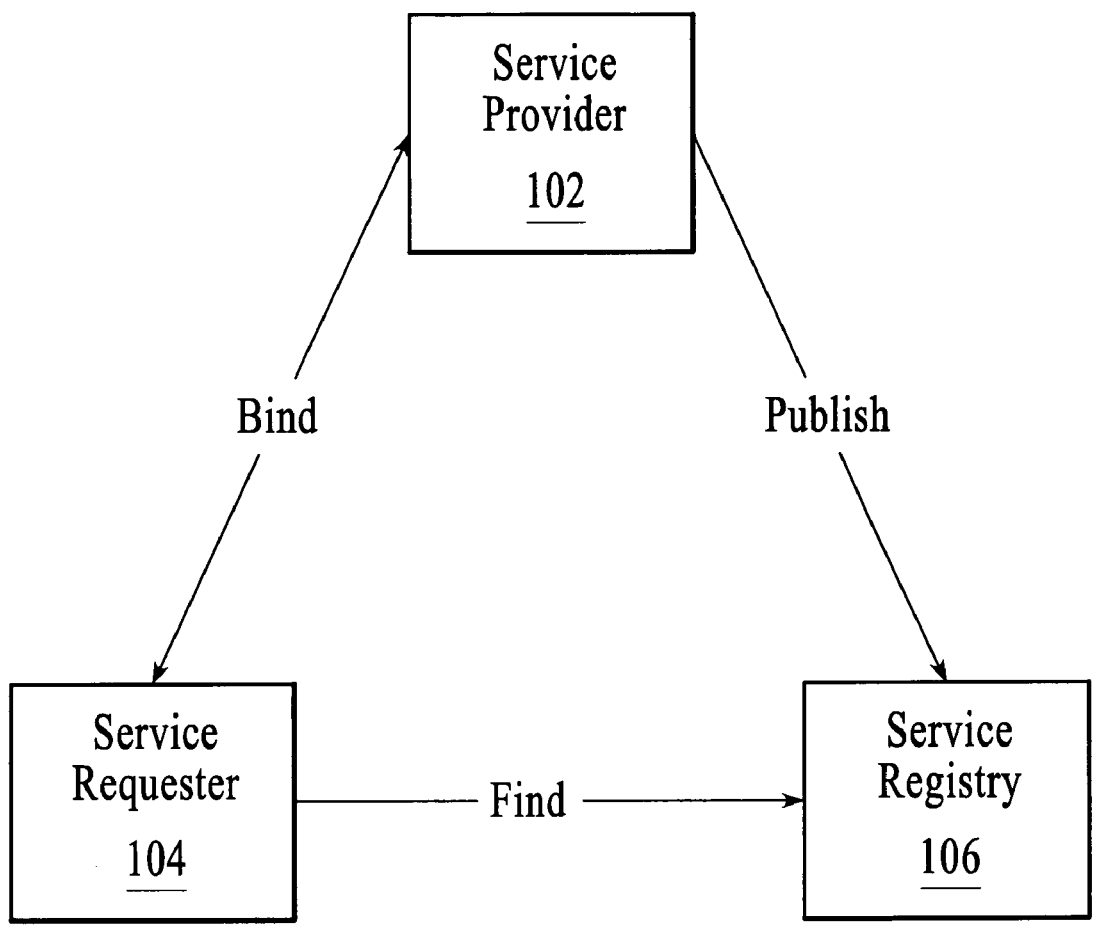
FIG. 1 illustrates the three key parts to the (prior art) Web services architecture.

FIG. 1 illustrates the three key parts to the (prior art) Web services architecture: a service provider 102, a service registry 106 and a service requester 104. As stated hereinbefore, the three key parts perform three operations on a Web service: publish, find and bind. The service provider 102 publishes a description of a Web service to the service registry 106. The service requester 104 finds this Web service description on the service registry 106 and binds to the Web service at the service provider 102.

Figure 7:
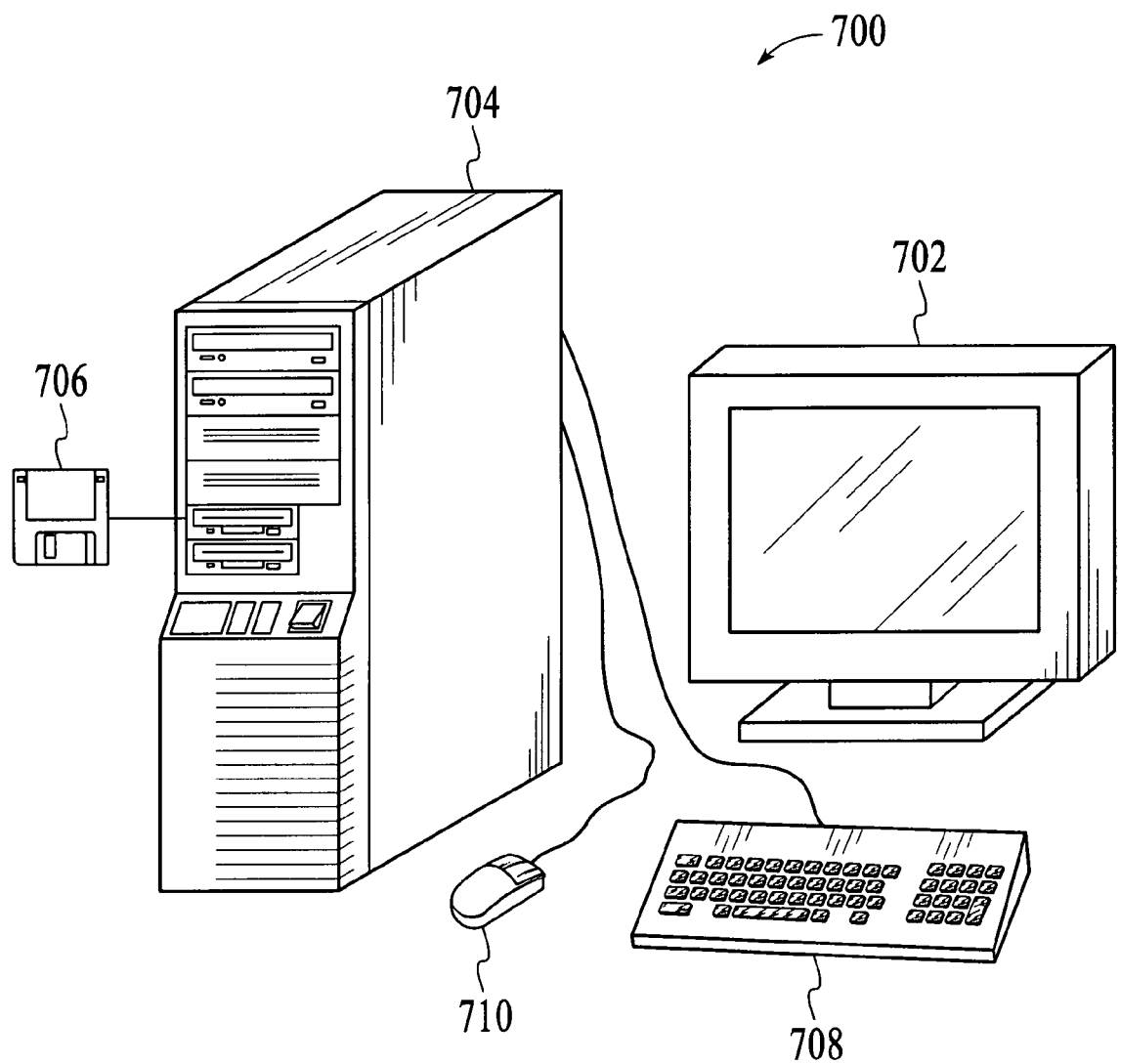
FIG. 7 illustrates a Web service browsing system, capable of executing methods exemplary of a preferred embodiment of the present invention.

A Web service interface system 700, capable of browsing Web services according to methods exemplary of a preferred embodiment of the present invention, is illustrated in FIG. 7. The Web service interface system 700 may act as either a service requester and a service provider or both. The Web service interface system 700 includes a display monitor 702 and a central processing unit 704. The central processing unit 704 may include hardware to network with other computers, long term and short term memory and a processor. As is typical, connected to the central processing unit 704 may be multiple input peripherals such as a keyboard 708 and a mouse 710. The Web service interface system 700 may be loaded with a Web services browsing application for executing methods exemplary of this invention from a software medium 706 which could be a disk, a tape, a chip or a random access memory containing a file downloaded from a remote source.

In overview, a preferred embodiment of the present invention involves use of the Web Service Inspection Language (WSIL), at the service requester 104 and/or the service provider 102, as a persistent data storage format for metadata related to Web service entities. As WSIL is designed to be extensible, WSIL can be easily extended to serve as a very light-weight persistent storage format for metadata related to Web service entities. Advantageously, the entities related to which metadata may be stored as a binding description in WSIL format are not limited to the three bindings that are defined in the WSIL specification, i.e., WSIL binding, UDDI binding (which consists of UDDI business and UDDI service) and WSDL binding. Indeed, other Web service related entities, such as UDDI registries, UDDI tModels, URL Services (such as HTTP Get/Post) or even contact information, may also be stored as a binding description using WSIL.

Aspects of a preferred embodiment of the present invention enable the definition of metadata for Web services related entities, which entities are not currently covered by the WSIL specification, to be stored in WSIL format. In addition, through the creation of new schemas, new metadata may be created and stored in WSIL format to describe relationships between Web service related entities. For example, a schema may be created for "business assertions" that enables the formation of relationships between business entities. These business assertions would also be stored as metadata in WSIL format.

To implement this persistent storage of metadata, schemas have been developed for organizing the collection of metadata that is to be stored as a binding description in WSIL. Exemplary schemas are illustrated in FIGS. 2, 3 and 4. Specifically, FIG. 2 illustrates an exemplary schema 200 for storing metadata related to a UDDI registry as a binding description in WSIL, FIG. 3 illustrates an exemplary schema 300 for storing contact information of business parties as a binding description in WSIL, FIG. 4 illustrates an exemplary schema 400 for storing metadata related to a business assertion as a binding description in WSIL and FIG. 5 illustrates an exemplary schema 500 for storing metadata related to a UDDI tModel as a binding description in WSIL.

In the UDDI scope, the term "business assertion" refers to a relationship link between two businesses. This relationship link can be of many types, for instance, the business may be business partners or the businesses may have Parent-Child relationship. UDDI registries provide a way to create a business assertion as long as descriptions of the businesses involved in the relationship link are published to public UDDI registries. However, if a description of one or both of the businesses is not published to public UDDI registries (a business description may be published to an internal repository, for example, a private UDDI registry), then a business assertion cannot be created.

The WSIL specification defines three known types of bindings that may be recorded in a WSIL document. Each exemplary schema 200, 300, 400, 500 (FIGS. 2, 3, 4 and 5) relates to a new type of binding that may be stored as a binding description in a WSIL document. The metadata expressed as a particular binding description in a given WSIL document may be a known type of binding or a new type of binding.

The storing of metadata related to Web service entities using WSIL, as provided by a preferred embodiment of the present invention, provides a way to make a "virtual" business assertion possible. In particular, a "virtual" business assertion may either be stored as a new binding (a new metadata type with a new referenceNamespace, similar to the exemplary schemas 200, 300 of FIGS. 2 and 3) or be stored directly in a UDDI business binding description. Storing business assertion metadata in the UDDI business binding description, in effect, extends the WSIL specification. That is, the WSIL specification already provides a way to "store" UDDI business and a preferred embodiment of the present invention provides a mechanism by which additional metadata may be included in what is otherwise a traditional UDDI business binding description.

If the particular binding description relates to a new type of binding, then a "namespace" of a schema for storing information related to the new type of binding may be included in an inspection element of the particular binding description. According to "Namespaces in XML", World Wide Web Consortium, 14 Jan. 1999 (see http://www.w3.org/TR/1999/REC-xml-names-19990114/), XML namespaces provide a simple method for qualifying element and attribute names used in Extensible Markup Language documents by associating the element and attribute names with namespaces identified by URI references. The namespace declaration is considered to apply to the element in which the namespace declaration is specified and to all elements within the content of that element, unless overridden by another namespace.

By including the namespace of the schema, the binding description of a new type of binding may be recognized by applications that can read WSIL documents. The namespace refers to the location where the schema can be found.

Once defined, a binding description related to a new type of binding can be added to a WSIL document. The binding description contains metadata that is defined by the schema associated with the new type of binding. The "referencedNamespace" attribute of a binding description identifies the namespace to which the Web service belongs. A WSIL document may act as a data store. Storing and retrieving data from the WSIL document may be seen to be easier than from other known data stores. By retrieving the metadata contained within a binding description, the associated Web service may be resurrected by a Web service interface system 700 as illustrated in FIG. 7.

In consideration of the exemplary schema 200 (FIG. 2) for storing metadata related to a UDDI registry as a binding description in WSIL, multiple namespaces are defined. The targetNamespace identifies the location for the exemplary schema 200. The remaining namespaces have a prefix of "xmlns". Those namespace prefixes that begin with "xml" are reserved for XML specification. In particular, xmlns:wsiluddi defines the location at which to look up types associated with the local name "wsiluddi". For example, "wsiluddi:businessDescription", which is used in the exemplary schema 400 of FIG. 4, means that the element "businessDescription" is an element defined in the location "http://schemas.xmlsoap.org/ws/2001/10/inspection/uddi/". The other declaration "xsd:string", which is used in the exemplary schema 200 of FIG. 2, indicates that the type "string" is a built-in simple type in the XML Schema Specification at location "http://www.w3.org/2001/XMLSchema".

FIGS. 6A, 6B and 6C illustrate a WSIL document 600 that contains six binding descriptions: a WSDL binding description 602; a UDDI tModel description 603; a first UDDI business binding description 604; a second UDDI business binding description 606; a UDDI registry binding description 608; and a binding description for business contact information 610. Note that the WSDL binding description 602 and the first UDDI business binding description 604 relate to known types of bindings that are defined in the WSIL specification and that the UDDI tModel binding description 603, the UDDI registry binding description 608 and the binding description for business contact information 610 relate to new types of bindings. The second UDDI business binding description 606 is a special case related to a known type of binding, with additional metadata included that is related to a business assertion.

The WSIL document 600 also includes an inspection element 601 that identifies namespaces to be used elsewhere in the document. For instance, the xmlns:wsiluddi namespace defines the location at which types beginning with the local name "wsiluddi" may be found. That is, whenever the local name "wsiluddi" is used as a prefix to a type, a definition of the type may be found at "http://schemas.xmlsoap.org/ws/2001/10/inspection/uddi/".

The first and second UDDI binding descriptions 604, 606 include a "wsiluddi:businessDescription" element. The <wsiluddi:businessDescription> element may be thought of as a <businessDescription> element with a local name "wsiluddi". Due to the fact that there could be many <businessDescription> schemas available on the internet, the local name "wsiluddi" assists in identifying where to locate the proper schema.

The WSDL binding description 602 may be identified by an initial element with a "referencedNamespace" attribute equal to "http://schemas.xmlsoap.org/wsdl". This "location" metadata indicates where the physical WSDL document resides. Taking advantage of this concept, metadata related to any Web service entity can be stored with enough information to resurrect the Web service entity. For example, a UDDI registry can be located using the publishURL and the inquiryURL defined in the UDDI registry schema 200 of FIG. 2.

The UDDI tModel binding description 603 may be identified by an initial element with a "referencedNamespace" attribute equal to "urn:uddi-org.api_v2". Notably, the inspection element 601 references the exemplary schema 500 for storing metadata related to a UDDI tModel as a binding description, which is illustrated in FIG. 5. Similar to a UDDI business, a UDDI tModel may be found (through a query) in an UDDI registry. The UDDI tModel binding description 603 includes "location" metadata and a tModelKey. The "location" metadata defines the location (the inquiry URL of a UDDI registry) where this tModel can be found. To resurrect the tModel, a tool may send a "find tModel request" to the URL given in the "location" metadata, along with the tModelKey. A tModelKey is a unique identifier for a tModel. Currently, the WSIL specification does not provide a way to store tModels. The exemplary schema 500 for storing metadata related to a UDDI tModel as a binding description, which is illustrated in FIG. 5, represents a new type of binding that may be stored as a binding description in a WSIL document.

The first UDDI business binding description 604 has an initial element with a "referencedNamespace" attribute equal to "urn:uddi-org:api_v2". The "location" metadata, in the "wsiluddi:businessDescription" element indicates the inquiry URL of the UDDI registry where this business has been registered. The "wsiluddi:businessKey" element is a unique identifier of the business within the UDDI registry. The "wsiluddi:businessKey" element is mainly used for discovery purposes. For example, if the user wants to resurrect or find this business, she first has to determine to where the "find request" should be sent. This is determined by the location metadata of the "wsiluddi:businessDescription" element (i.e., the inquiry URL of the UDDI registry). Secondly, the business can be identified using the "wsiluddi:businessKey".

The second UDDI business binding description 606 has an initial element with a "referencedNamespace" attribute equal to "urn:uddi-org:api_v2". Like the first UDDI business binding description 604, a business is identified by "location" metadata and a "wsiluddi:businessKey" element. Notably, the inspection element 601 references the exemplary schema 400 for storing metadata related to a business assertion as a binding description, which is illustrated in FIG. 4. In particular, the location of the exemplary schema 400 is referenced as local name "businessassertion". The second UDDI business binding description 606 has an element not included in the first UDDI business binding description 604, namely <businessassertion:businessAssertion>, for metadata related to a business assertion. Within the businessAssertion element, the business identified as the fromBusiness in the second UDDI business binding description 606 has formed a relationship with the business identified as the toBusiness.

The UDDI registry binding description 608 may be identified by an initial element with a "referencedNamespace" attribute equal to "http://www.example.com/uddiregistry/". The wsiluddiregistry:registryDescription element has three components, namely wsiluddiregistry:inquiryURL, wsiluddiregistry:publishURL and wsiluddiregistry:registrationURL. Notably, the inspection element 601 references the exemplary schema 200 for storing metadata related to a UDDI registry as a binding description, which is illustrated in FIG. 2. In particular, the location of the exemplary schema 200 is referenced as local name "wsiluddiregistry". The inquiryURL and publishURL are important pieces of information in a UDDI registry. The wsiluddiregistry:inquiryURL component indicates the inquiry URL of the UDDI registry. The inquiryURL is used for discovery purposes. A find request/operation such as finding a business would be sent to this URL. The wsiluddiregistry:publishURL component indicates the publishURL of the UDDI registry. The publishURL is used for publication purposes. A publish request/operation such as registering a new business would be sent to this URL. wsiluddiregistry:registrationURL refers to a URL which enables users to register with a UDDI registry. This is a requirement for writing information into these registries, i.e., publishing business entities, business services and tModels.

The binding description for business contact information 610 may be identified by an initial element with a "referencedNamespace" attribute equal to "http://www.example.com/contactinfo/". Notably, the inspection element 601 references the exemplary schema 300 for storing contact information of business parties as a binding description, which is illustrated in FIG. 3. In particular, the location of the exemplary schema 300 is referenced as local name "wsilcontactinfo". The wsilcontactinfo:contactURL element provides a link to a location of contact information for a particular business party.

In operation, an application may be designed to be executed at a Web service interface system 700 such as is illustrated in FIG. 7. Such an application allows a user to browse descriptions of Web services either provided at service registries or by the service providers directly. WSIL may be employed by such an application to store metadata related to those entities that the user browses and deems worthy of recording. In particular, the user may store metadata related to such entities as UDDI registries, UDDI businesses, UDDI services, UDDI service interfaces, WSDL services and WSIL links much in the familiar manner in which web site addresses are saved as "Favorites" and "Bookmarks" in Microsoft® Internet Explorer and Netscape® Navigator, respectively. The metadata related to Web service entities is stored by the application in a WSIL document, as exemplified above.

Figure 8:
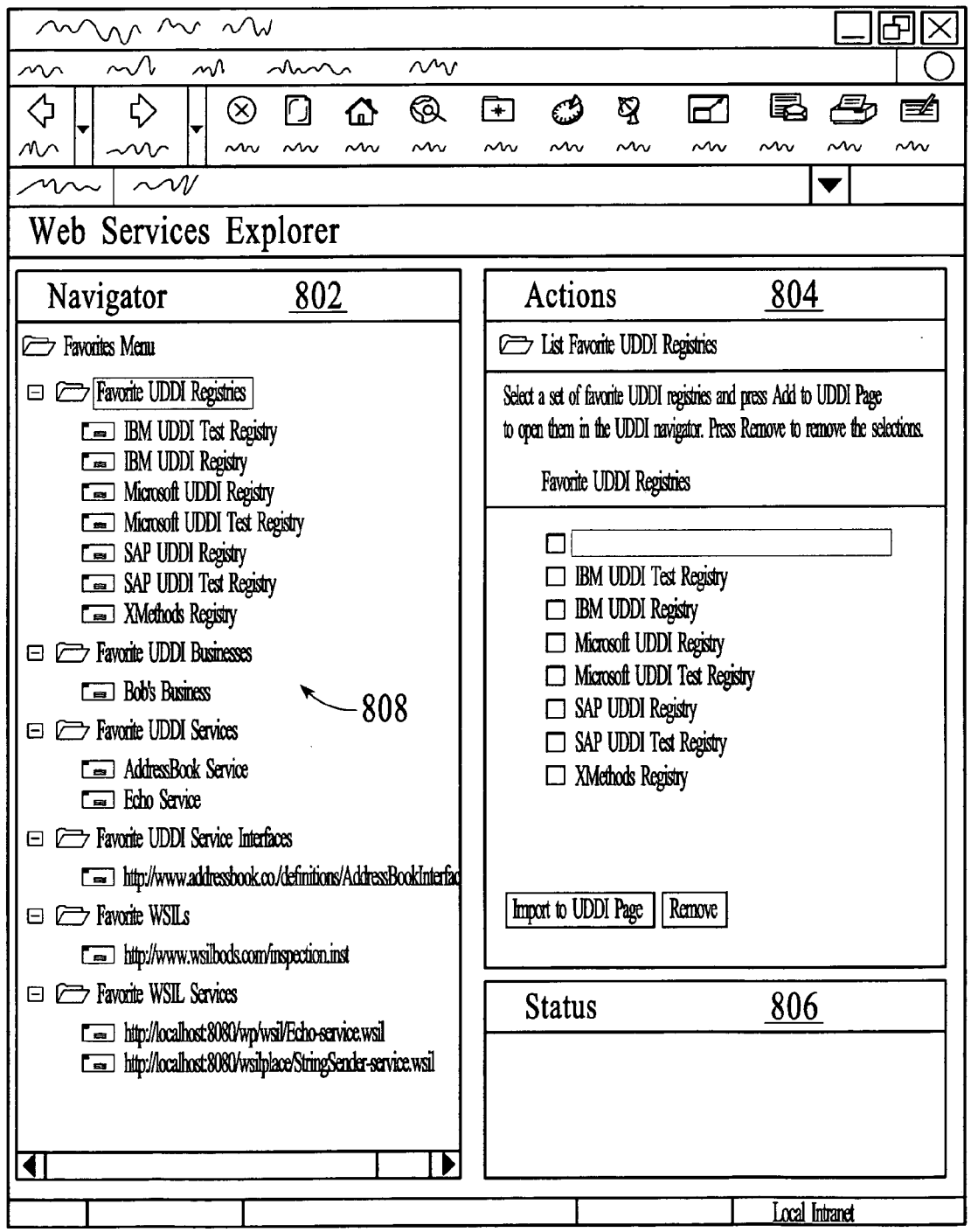
FIG. 8 illustrates an exemplary Web service browsing application executed on the Web service browsing system of FIG. 7.

FIG. 8 illustrates an exemplary Web service browsing application 800 with a Navigator panel 802, an Actions panel 804 and a Status panel 806. As illustrated in FIG. 8, the exemplary Web service browsing application 800 is implemented as a Java Server Page (JSP), which is a Hyper-Text Markup Language page that can include and run Java code. The exemplary Web service browsing application 800 is shown as executed within a web browser window. Web service-related entities stored in a WSIL document are presented in a "Favorites" page 808 wherein the entities are shown as nodes in the Navigator panel 802. The exemplary Web service browsing application 800 may have other pages, including a UDDI page, used for UDDI discovery and publication, and a WSIL page, used for WSIL navigation. The UDDI page can be used to find, manage and publish Web service related information to and from a UDDI registry. A user can open a WSIL document in the WSIL page and view the Web service entity related metadata that is defined in that particular WSIL document.

The entities in the Favorites page 808 may be resurrected and added to a UDDI page or a WSIL page at any time. For instance, a WSIL document, information about which is stored in the WSIL document used by the Favorites page 808, may be located on the Favorites page 808 and added to the WSIL page for viewing.

In a further embodiment of the present invention, a namespace may be created for a new type of metadata related to a Web service entity. For example, the contact information of a business may be required as a new type of metadata related to a Web service entity. Calling the new type of metadata "contactinfo", a new namespace, "http://www.example.com/contactinfo/", for the type of metadata called contactinfo may be manually created. Additionally, a schema is developed for the contactinfo type of metadata. When it is necessary to add a contactinfo type of metadata to the WSIL document used by the Favorites page 808, "http://www.example.com/contactinfo/" is indicated as the namespace of the type of metadata. Thus, the Web service browsing application internal model may be extended to allow adding contact information to the Favorites page 808.

One advantage of storing Web service entity related metadata in a document formatted in WSIL is that WSIL is XML-based. Thus, metadata are stored as XML fragments and the XML fragments are human readable, platform independent and conform to an open standard.

As will be apparent to a person skilled in the art, WSIL is but one format for assisting in the inspection of a site for available services and the preferred embodiment of the present invention is not intended to be limited to implementation using WSIL. Indeed, another format for assisting in the inspection of a site for available services may not even be XML-based, instead being based on an other data language or structure. The other data language may, for instance, be a different variation of Standard Generalized Markup Language (SGML) or a different (perhaps proprietary) electronic data interchange format.

Other modifications will be apparent to those skilled in the art and, therefore, the invention is defined in the claims.

We claim:

1. A computer readable storage medium containing program instructions, which when executed by a computer, causes the computer to store metadata related to Web service entities by performing a method comprising:
   browsing a Web service; and
   storing metadata relating to an entity of the Web service as a binding description in a document, the document being in a format operable to assist in an inspection of a site comprising a plurality of available Web services,
   wherein the entity of the Web service is one of a Universal Description, Discovery, and Integration (UDDI) registry entity, a UDDI tModel entity, and a business contact information entity, and
   wherein the document is in a Web Services Inspection Language (WSIL) format.

2. The computer readable storage medium of claim 1, wherein the metadata is stored according to a schema.

3. The computer readable storage medium of claim 2, wherein the schema defines a namespace for identifying a location for the schema.

4. The computer readable storage medium of claim 2, wherein the schema includes an element for specifying a Uniform Resource Locator for use in querying the entity of the Web service.

5. The computer readable storage medium of claim 2, wherein the schema includes an element for specifying the Uniform Resource Locator to which publish requests for the entity of the Web service may be sent.

6. The computer readable storage medium of claim 2, wherein the schema includes an element for specifying a Uniform Resource Locator to which registration requests for the entity of the Web service may be sent.

7. The computer readable storage medium of claim 2, wherein the metadata includes a business assertion, the business assertion specifying a relationship link between a first business and a second business.

8. The computer readable storage medium of claim 7, wherein the schema includes an element for specifying a Uniform Resource Locator for use in locating a UDDI registry at which a second business is registered.

9. The computer readable storage medium of claim 7, wherein the schema includes an element for specifying a unique identifier of the second business.

10. The computer readable storage medium of claim 7, wherein the schema includes an element for specifying a status of the business assertion.

11. The computer readable storage medium of claim 7, wherein the schema includes an element for specifying a type of the business assertion.

12. The computer readable storage medium of claim 2, wherein the schema includes an element for specifying a unique identifier for the entity of the Web service.

13. The computer readable medium of claim 1, wherein the method further comprises:
storing metadata relating to another entity of the Web service as another binding description in the document, wherein the other entity of the Web service is one of a Web Service Description Language (WSDL) entity, a UDDI business entity, a UDDI service entity, and a WSIL entity.

14. A method for storing metadata related to Web service entities comprising:
browsing a Web service; and
storing metadata relating to an entity of the Web service as a binding description in a document, the document being in a format operable to assist in an inspection of a site comprising a plurality of available Web services, wherein the entity of the Web service is one of a Universal Description, Discovery, and Integration (UDDI) registry entity, a UDDI tModel entity, and a business contact information entity, and
wherein the document is in a Web Services Inspection Language (WSIL) format.

15. The method of claim 14, wherein the metadata is stored according to a schema.

16. The method of claim 15, wherein the schema defines a namespace for identifying a location for the schema.

17. The method of claim 14, further comprising:
storing metadata relating to another entity of the Web service as another binding description in the document, wherein the other entity of the Web service is one of a Web Service Description Language (WSDL) entity, a UDDI business entity, a UDDI service entity, and a WSIL entity.

18. A Web services browsing system implemented on a computer system, the Web services browsing system comprising:
means for browsing a Web service; and
means for storing metadata related to an entity of the Web service as a binding description in a document, the document being in a format operable to assist in an inspection of a site comprising a plurality of available Web services,
wherein the entity of the Web service is one of a Universal Description, Discovery, and Integration (UDDI) registry entity, a UDDI tModel entity, and a business contact information entity, and
wherein the document is in a Web Services Inspection Language (WSIL) format.

19. The system of claim 18, wherein the metadata is stored according to schema.

20. The system of claim 19, wherein the schema defines a namespace for identifying a location for the schema.

21. The system of claim 18, further comprising:
means for storing metadata related to another entity of the Web service as another binding description in the document, wherein the other entity of the Web service is one of a Web Service Description Language (WSDL) entity, a UDDI business entity, a UDDI service entity, and a WSIL entity.

22. A computer readable storage medium containing program instructions, which when executed by a computer, causes the computer to resurrect Web service entity by performing a method comprising:
displaying metadata related to a plurality of Web service entities, the metadata being stored as a plurality of binding descriptions in a document, wherein the document is in a format operable to assist in an inspection of a site comprising a plurality of available Web services;
selecting a Web service entity from the plurality of Web service entities; and
processing the selected Web service entity,
wherein at least one of the plurality of Web service entities is a Universal Description Discovery, and Integration (UDDI) registry entity, a UDDI tModel entity, or a business contact information entity,
wherein at least another of the plurality of Web service entities is a Web Service Description Language (WSDL) entity, a UDDI business entity, a UDDI service entity, or a Web Service Inspection Language (WSIL) entity, and
wherein the document is in a WSIL format.

23. A method for resurrecting a Web service entity comprising:
displaying metadata related to a plurality of Web service entities, the metadata being stored as a plurality of binding descriptions in a document, wherein the document is in a format operable to assist in an inspection of a site comprising a plurality of available Web services;
selecting a Web service entity from the plurality of Web service entities; and
processing the selected Web service entity,
wherein at least one of the plurality of Web service entities is a Universal Description Discovery, and Integration (UDDI) registry entity, a UDDI tModel entity, or a business contact information entity,
wherein at least another of the plurality of Web service entities is a Web Service Description Language (WSDL) entity, a UDDI business entity, a UDDI service entity, or a Web Service Inspection Language (WSIL) entity, and
wherein the document is in a WSIL format.

24. A Web services browsing system comprising:
a display for displaying metadata related to a plurality of Web service entities, the metadata being stored as a plurality of binding descriptions in a document, wherein the document is in a format operable to assist in an inspection of a site comprising a plurality of available Web services;

means for selecting a Web service entity from the plurality of Web service entities; and means for processing the selected Web service entity, wherein at least one of the plurality of Web service entities is a Universal Description Discovery, and Integration (UDDI) registry entity, a UDDI tModel entity, or a business contact information entity, wherein at least another of the plurality of Web service entities is a Web Service Description Language (WSDL) entity, a UDDI business entity, a UDDI service entity, or a Web Service Inspection Language (WSIL) entity, and wherein the document is in a WSIL format.

* * * * *